United States Patent [19]
Bennoit et al.

[11] Patent Number: 5,690,834
[45] Date of Patent: Nov. 25, 1997

[54] PROCESS AND APPARATUS FOR SEPARATING OFF SUSPENDED MATTER FROM LIQUIDS

[75] Inventors: Horst Bennoit, Völklingen; Gerhard Müller, Königstein; Friedhelm Zorn, Ebertshausen, all of Germany

[73] Assignee: Hoechst Aktiengesellschaft, Frankfurt, Germany

[21] Appl. No.: 553,697

[22] PCT Filed: Mar. 28, 1995

[86] PCT No.: PCT/EP95/01156

§ 371 Date: Dec. 1, 1995

§ 102(e) Date: Dec. 1, 1995

[87] PCT Pub. No.: WO95/27566

PCT Pub. Date: Oct. 19, 1995

[30] Foreign Application Priority Data

Apr. 11, 1994 [DE] Germany .................. 44 11 991.7

[51] Int. Cl.⁶ .................................................. C02F 1/24
[52] U.S. Cl. .................. 210/703; 210/199; 210/221.2
[58] Field of Search .......................... 210/703, 199, 210/221.2, 221.1, 704, 705

[56] References Cited

U.S. PATENT DOCUMENTS

| | | |
|---|---|---|
| 1,333,712 | 3/1920 | Groch . |
| 3,179,252 | 4/1965 | Urablik . |
| 4,086,160 | 4/1978 | Roesler . |
| 4,101,409 | 7/1978 | Austin . |
| 4,253,949 | 3/1981 | Hines . |
| 4,279,754 | 7/1981 | Pollock . |
| 4,287,070 | 9/1981 | Pollock . |
| 4,367,146 | 1/1983 | Pollock . |
| 4,737,272 | 4/1988 | Szatkowski . |

FOREIGN PATENT DOCUMENTS

| | | |
|---|---|---|
| 958322 | 11/1974 | Canada . |
| 2 457 120 | 12/1980 | France . |
| 3826955 | 2/1990 | Germany . |
| 3839371 | 5/1990 | Germany . |

*Primary Examiner*—Thomas M. Lithgow
*Attorney, Agent, or Firm*—Curtis, Morris & Safford, P.C.

[57] ABSTRACT

In the process for separating off by flotation (pressure release) suspended matter from liquids which are present in a gas-introduction reactor, the suspension to be withdrawn for flotation is conducted at a flow velocity $\leq 0.3$ m/s against the natural direction of bubble rise, gas being additionally introduced into the suspension. The gas-treated suspension is withdrawn at the bottom of the gas-introduction apparatus and it is fed to flotation.

4 Claims, 1 Drawing Sheet

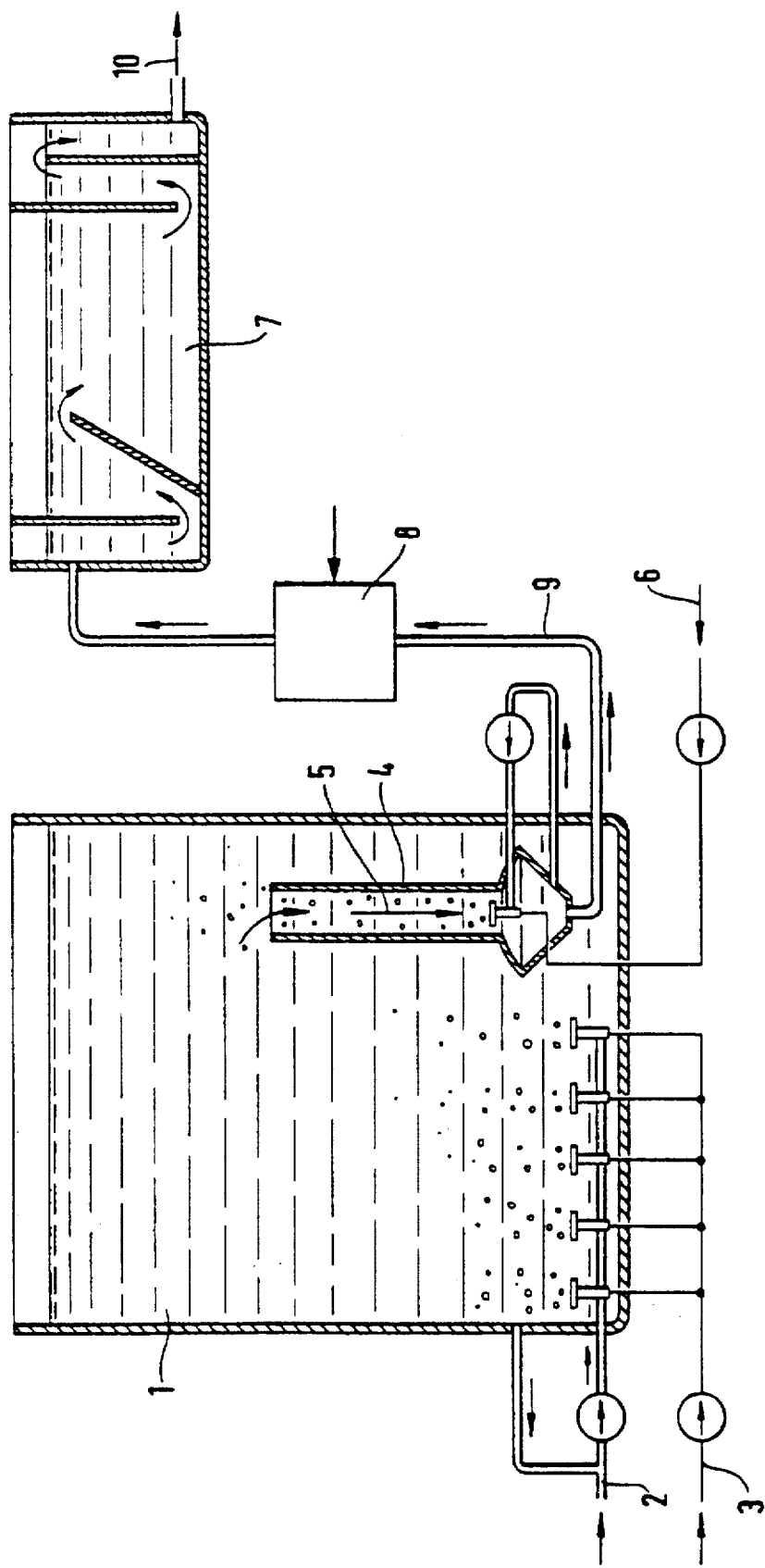

PROCESS AND APPARATUS FOR SEPARATING OFF SUSPENDED MATTER FROM LIQUIDS

CROSS-REFERENCE TO RELATED APPLICATIONS

This application claims priority to German Application No. P 44 11 991.7, filed Apr. 11, 1994 and PCT application PCT/EP95/01156 incorporated herein by reference.

BACKGROUND OF THE INVENTION

1. Field of the Invention

The invention relates to a process for separating off by flotation (pressure release) suspended matter from liquids which are present in a gas-introduction reactor.

The invention further relates to an apparatus for carrying out the above process.

2. Description of the Related Art

It is known to separate off by sedimentation the solids of a waste water flowing off from an activation stage. However, in many cases, the sedimentation operation is very susceptible to breakdown, in particular when the settling process proceeds too slowly as a result of insufficient density differences between activated sludge and water. In many activation plants small gas bubbles have an interfering effect on the sedimentation process, which small gas bubbles are carried with the sludge-water mixture from the activation stage to the secondary clarification, or are formed by degassing as a result of oversaturation with gas or as a result of biochemical reactions in the secondary clarification tank.

As an alternative to sedimentation, flotation of the solids from the sludge-water mixtures is known. A distinction is made between two flotation processes, that is gas-introduction flotation and pressure-release flotation.

In gas-introduction flotation, gas is introduced into the sludge-water mixture in the contact and mixing zone of the flotation plant in the form of gas bubbles which generally have a bubble diameter of 200–1000 µm. The gas bubbles accumulate on the sludge flocks and pull the sludge flocks to the surface. With the aid of a skimmer, the sludge is removed. Gas-introduction flotation poses problems in the activated-sludge process since the bubble sizes which can be achieved on gas-introduction are generally too large with respect to the sludge flocks. These relatively large bubbles adhere only in part to the sludge flocks. This can be remedied by addition of organic flocculants which additionally considerably increases the process costs.

A substantially better bubble spectrum—smaller bubbles—can be achieved by pressure-release flotation. The gas bubbles in this process are generated by depressurizing a liquid saturated with air at high pressure (4 to 6 bar) and are thus uniformly distributed in the sludge-water mixture. In pressure-release flotation, generally termed dissolved air flotation, a distinction is likewise made between two process variants, that is dissolved air flotation with full-stream aeration and dissolved air flotation with part-stream aeration.

In dissolved air flotation with full-stream aeration, the sludge-water mixture taken off from the activation tank is saturated with air at pressures of 0.5 to 6 bar and then depressurized upstream of the flotation cell. The disadvantage of this process, apart from the high operating costs for saturation with air, is on the one hand the susceptibility of the plant to blockage by the activated sludge and on the other hand in the disintegration of activated-sludge flock.

In dissolved air flotation with part-stream aeration, fresh water or some of the effluent purified clarified water is saturated with air at a pressure of 4 to 6 bar, mixed with the sludge-water mixture and depressurized in a contacting and mixing zone of the flotation plant. The costs for the generation of the pressurized water are also very high with this variant. For 1 $m^3$ of sludge-water mixture, in such plants up to 1 $m^3$ of pressurized water is required.

OBJECT OF THE INVENTION

The object therefore underlying the present invention is to create a process which utilizes the advantages of pressure-release flotation but which decreases the energy requirement for flotation to a considerable extent.

The object is achieved by the process described at the outset in which the suspension to be withdrawn for flotation is conducted at a flow velocity <0.3 $ms^{-1}$ against the natural direction of bubble rise, gas being additionally introduced into the suspension, the gas-treated suspension being withdrawn at the bottom of the gas-introduction apparatus and fed to flotation.

Gas can be introduced into the suspension by passing in air, pressurized water or a mixture of microbubbles and water. The gas-treated suspension can be subjected to further introduction of gas before it is passed to flotation.

In the apparatus for carrying out the process, a downflow reactor having a slenderness ratio of height to diameter (H/D)>1, preferably 3<H/D<30, can be arranged in a gas-introduction reactor having a liquid depth of 5 to 30 m.

The downflow reactor can of course be arranged equally successfully between the gas-introduction reactor and flotation device and in the flotation device itself.

SUMMARY OF THE INVENTION

The advantages of the process according to the invention are essentially that the gas content in the sludge-water mixture, that is in the suspension, can be considerably increased with minimal energy consumption. Furthermore, the process makes it possible to influence the carbon dioxide concentration present in the suspension by varying the additional amount of gas.

BRIEF DESCRIPTION OF THE DRAWING

FIG. 1 shows an apparatus for separating off suspended matter from liquids.

DETAILED DESCRIPTION OF THE INVENTION

The invention is described in more detail below with reference to examples. In all the examples, in the result the solids content in the clarified water is intended to be ≦30 mg/l and the rate of sludge rise ≧15 m/h.

EXAMPLES

Example 1

In a discontinuous flotation experiment, 8 l of sludge-water mixture having a pH of 6.8, a temperature of 20° C. and a biomass concentration of 4 g/l were withdrawn from a waste water purification plant having an activation space of height 3.8 m and mixed with pressurized water (5 bar superatmospheric pressure) by the known process. The required rate of sludge rise of ≧15 m/h and a solids concentration in the clarified water of≦30 mg/l was achieved at an addition of 3.5 l of pressurized water (44.0% by weight).

Example 2

In a discontinuous flotation experiment, 8 1 of sludge-water mixture having a pH of 6.8, a temperature of 20° C. and a biomass concentration of 4 g/1 were withdrawn at the bottom from a waste water purification plant having an activation space of height 10 m. For the flotation of the solids, 2.7 1 of pressurized water at 5 bar (35% by weight) were required for the known process in order to obtain the required solids concentration of ≦30 mg/1 in the clear stream at a rate of sludge rise of ≧15 m/h. If the activated-sludge/water mixture is passed by the process according to the invention against the direction of bubble rise through an apparatus (downflow column) having a slenderness ratio of H/D equal to 5, 0.6 1 of air being introduced, only 1.7 1 of pressurized water at 5 bar (22% by weight) are required for the discontinuous flotation of the solids. This means that only 60% of the pressurized water is necessary for the same result.

Example 3

In a continuous biological waste water purification plant comprising a 10 m high activation tank and a flotation cell having a surface area of 10 m², 40 m³/h of sludge-water mixture having a solids content of 4 kg of dry matter per m³ are withdrawn from the activation tank and fed to the flotation cell.

For adequate separation of biomass (≦30 mg/1 of clarified water) and water, 14 m³ of pressurized water at 5 bar per hour are fed to the sludge-water mixture by the known process. The solids concentration in the clarified water is 24 mg/1 and is thus below the objective.

If the sludge-water mixture withdrawn from the activation tank is passed by the process according to the invention against the direction of bubble rise through an apparatus having a height of 9 m and a diameter of 0.4 m, that is a slenderness ratio H/D equal to 22.5 and 1 $m^3_{(S.T.P.)}$ of air per hour is introduced, only 8 m³/h of pressurized water are required for a solids content of 16 mg/1 in the clarified water.

Example 4

10 m³/h of sludge-water mixture are continuously withdrawn in a side stream from a 20 m high gas-introduction reactor having an integrated downflow column and passed to a flotation cell having a clarifying area of 2 m². The biomass concentration is 3 g/1. To separate off the activated sludge within the objective of <30 mg/1 of solids concentration in the clarified water, 1.5 m³/h of pressurized water at 5 bar are fed into the flotation cell. Concentrations <20 mg/1 are achieved.

The FIGURE shows the apparatus according to the invention depicted diagrammatically in an exemplary embodiment. In a gas-introduction reactor (activation tank) 1 having a waste water feed line 2 and gas feed line 3, there is arranged a downflow reactor 4. The arrow 5 indicates the direction of the sludge-water mixture and 6 the air feed for the additional gas-introduction to the sludge-water mixture. A flotation cell 7 (pressure-release device not shown) is grouped with the gas-introduction reactor 1. In the present example, the apparatus 8 for producing and adding pressurized water to the sludge-water mixture is arranged in the connection line 9 between an activation tank 1 and flotation cell 7. 10 indicates the clear stream.

In accordance with the process according to the invention, the sludge-water mixture is fed via the downflow reactor 4 to the flotation cell 7, gas being simultaneously introduced through the air feed 6. The flow of the sludge-water mixture into the downflow reactor 4 is directed against the natural direction of bubble rise, the flow velocity being in the range from 0.01 to 0.3 m/s, preferably from 0.05 to 0.2 m/s.

We claim:

1. A process for separating off suspended matter from liquids which are present in a gas-introduction reactor by pressure release flotation, which comprises introducing gas into the liquid which contains said suspended matter, conducting the gasified liquid containing suspended matter in a downflow reactor at a flow velocity of 0.01 m/s to 0.3 m/s downwardly against the natural direction of bubble rise, while introducing gas in a lower portion of said downflow reactor which contacts said downwardly flowing gasified liquid containing suspended matter, withdrawing a gas-treated liquid containing suspended matter at the bottom of the downflow reactor and feeding it to pressure release flotation wherein suspended matter attached to microbubbles is separated off by floating away from the liquid.

2. The process as claimed in claim 1, wherein the gas-treated liquid containing suspended matter is subjected to further introduction of gas before it is passed to flotation.

3. An apparatus comprising a gas-introduction reactor and a downflow reactor and a pressure release flotation cell for separating off suspended matter from liquids which are present in the gas-introduction reactor by pressure release flotation wherein the apparatus provides said gas introduction reactor having means for introducing gas into the liquid which contains said suspended matter, said downflow reactor comprises means for conducting the gasified liquid containing suspended matter in the downflow reactor at a flow velocity of 0.01 m/s to 0.3 m/s downwardly against the natural direction of bubble rise, while said downflow reactor further includes means for introducing gas in a lower portion of said downflow reactor which contacts said downwardly flowing gasified liquid containing suspended matter, withdrawing a gas-treated liquid containing suspended matter at the bottom of the downflow reactor and feeding it to said pressure release flotation cell wherein suspended matter attached to microbubbles is separated off by floating away from the liquid, and wherein the downflow reactor has a slenderness ratio of height to diameter (H/D)>1, and is arranged in the gas-introduction reactor, said gas-introduction reactor having a liquid depth of 5 to 30 m.

4. The apparatus as claimed in claim 3 wherein the slenderness ratio of height to diameter of said downflow reactor is 3<H/D≦30.

* * * * *